(12) United States Patent
Hirosue

(10) Patent No.: US 7,167,214 B2
(45) Date of Patent: Jan. 23, 2007

(54) SIGNAL PROCESSING UNIT AND LIQUID CRYSTAL DISPLAY DEVICE

(75) Inventor: Yoji Hirosue, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 491 days.

(21) Appl. No.: 10/440,318

(22) Filed: May 19, 2003

(65) Prior Publication Data

US 2003/0222841 A1   Dec. 4, 2003

(30) Foreign Application Priority Data

May 30, 2002   (JP)   ............................. 2002-156565

(51) Int. Cl.
| | |
|---|---|
| H04N 5/14 | (2006.01) |
| H04N 5/202 | (2006.01) |
| H04N 9/74 | (2006.01) |
| G06K 9/00 | (2006.01) |
| G09G 5/00 | (2006.01) |

(52) U.S. Cl. ..................... 348/687; 348/577; 348/655; 348/672; 348/673; 348/674; 348/678; 345/589; 345/617; 382/168

(58) Field of Classification Search ................ 348/687, 348/577, 655, 672–678; 345/589, 617; 382/168–172
See application file for complete search history.

(56) References Cited

U.S. PATENT DOCUMENTS

| | | | | |
|---|---|---|---|---|
| 5,450,217 A | * | 9/1995 | Eschbach et al. | ........... 358/518 |
| 5,748,802 A | * | 5/1998 | Winkelman | ................. 382/271 |
| 5,936,684 A | * | 8/1999 | Murayama | ................... 348/673 |
| 5,956,014 A | * | 9/1999 | Kuriyama et al. | .......... 345/690 |
| 6,075,574 A | * | 6/2000 | Callway | ...................... 348/673 |
| 6,373,533 B1 | * | 4/2002 | Kawabata et al. | .......... 348/672 |
| 6,388,716 B1 | * | 5/2002 | Tsuzuki et al. | ............. 348/687 |
| 6,785,414 B1 | * | 8/2004 | McStravick et al. | ........ 382/162 |
| 6,791,565 B2 | * | 9/2004 | Kanai | .......................... 345/589 |
| 6,795,053 B1 | * | 9/2004 | Funamoto et al. | .......... 345/102 |
| 6,850,214 B2 | * | 2/2005 | Nishitani et al. | ............. 345/87 |
| 6,940,522 B2 | * | 9/2005 | Kanai | .......................... 345/600 |
| 2002/0033830 A1 | * | 3/2002 | Yamakawa | ................. 345/600 |
| 2002/0145678 A1 | * | 10/2002 | Suzuki et al. | ............... 348/675 |
| 2005/0162563 A1 | * | 7/2005 | Adams | ....................... 348/678 |

FOREIGN PATENT DOCUMENTS

| | | |
|---|---|---|
| JP | 3-077916 | 4/1991 |
| JP | 4-270378 | 9/1992 |

* cited by examiner

Primary Examiner—Brian P. Yenke
(74) Attorney, Agent, or Firm—Staas & Halsey LLP

(57) ABSTRACT

A signal processing unit in a liquid crystal display device, etc., includes a brightness component appearance frequency measuring unit that measures an appearance frequency of each brightness component in a video signal; a parameter outputting unit that outputs a distribution of each brightness component, as a parameter, based on the appearance frequency of each brightness component measured by the brightness component appearance frequency measuring unit; a changing signal outputting unit that alters an input signal recorded in a recording unit, by using the parameter, and that outputs the input signal as a changing signal; and a brightness component changing unit that changes a distribution of each brightness component, by using the changing signal, and that outputs the video signal in which the distribution of each brightness component is changed.

6 Claims, 8 Drawing Sheets

Fig.8
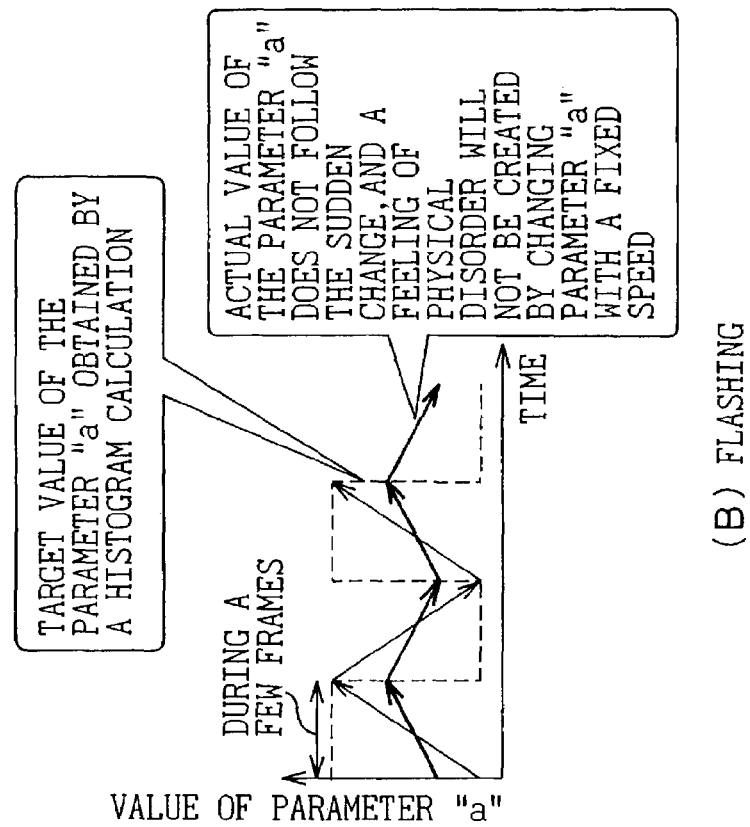
(B) FLASHING
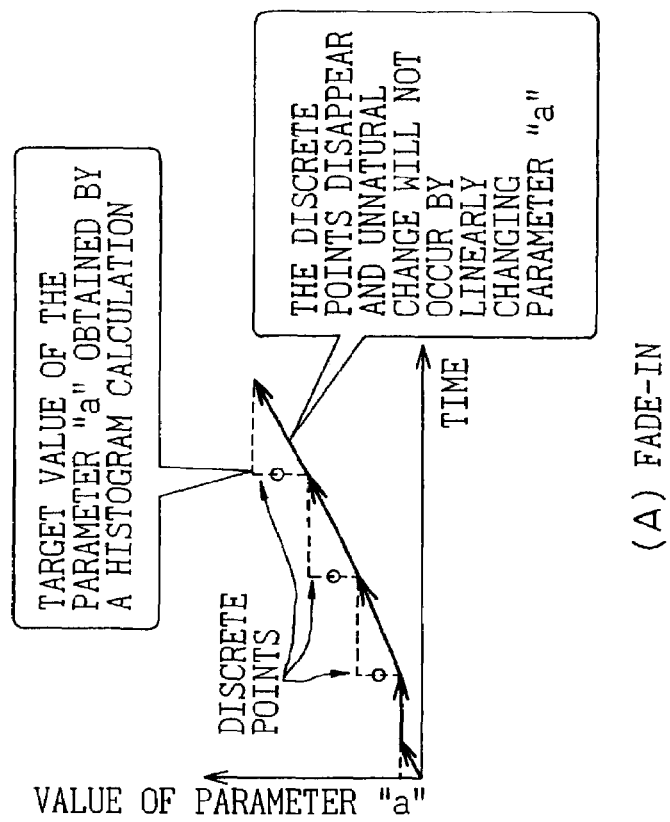
(A) FADE-IN

SIGNAL PROCESSING UNIT AND LIQUID CRYSTAL DISPLAY DEVICE

BACKGROUND OF THE INVENTION

1. Field of the Invention

The present invention relates to a liquid crystal display device. In particular, the present invention relates to a liquid crystal display device, to which a television signal for a television apparatus with NTSC (National Television System Committee), PAL (Phase Alternation by Line), HDTV (High Definition Television), or the like, and an RGB (Red, Green and Blue) signal for a personal computer, can be input.

2. Description of the Related Art

There are CRT (Cathode Ray Tube) display device and a liquid crystal display device for displaying moving pictures of a television apparatus or the like.

A CRT display device is a self-luminous analog device comprised of a fluorescent phosphor which emits light spontaneously when electrons collide with the phosphor.

Not to brighten or darken a screen unnecessarily, a CRT display device carries out the following process; namely, the CRT display device keeps sufficient brightness so as not to darken the screen unnecessarily, while it operates a beam limiter circuit so as not to brighten and conduct an auto-contrast process to automatically decrease the brightness.

On the other hand, a liquid crystal display device does not emit light by itself, unlike the CRT display device. Light emitted from a light source (or back light) is transmitted through a liquid crystal panel, and thereby, an image (or images) is displayed on the screen. Further, the image displayed on the screen in the liquid crystal display device is expressed by using the digital degree of gradation, unlike the image displayed on the screen in the CRT display device.

A conventional liquid crystal display device does not carry out the above-mentioned process of the CRT display device concerning the brightness. However, in the conventional liquid crystal display device, for example, the following process is widely known as one of effective measures for controlling the brightness.

An average value of each brightness component, which is represented by using digital gradation and is included in an input video signal, is observed. If the screen is bright on the whole, the brightness of the back light is controlled to be decreased, and if the screen is dark on the whole, the brightness of the back light is controlled to be increased.

At present, CRT display devices are used in most of television apparatuses, but in the future, liquid crystal display devices will become prevalent.

However, the above-mentioned process regarding the brightness of the screen in the conventional liquid crystal display device pertains to the increase and the decrease in the brightness of the back light, and therefore, the brightness of a dark portion which should be expressed as black is liable to be increased, and the brightness of a bright portion which should be expressed as white is liable to be decreased.

Accordingly, the above-mentioned process cannot achieve the contrast as high as the CRT display device, in the conventional liquid crystal display device.

Thus, the conventional liquid crystal display device employing the above-mentioned process cannot provide an adequate and agreeable image (or images) for a viewer who is familiar with the CRT display device in a television apparatus or the like.

SUMMARY OF THE INVENTION

In view of these facts, an object of the present invention is to provide a signal processing unit and a liquid crystal display device, including a signal processing unit, which can achieve a contrast as high as the CRT display device to improve the degree of visibility of a dark area and a bright area on a screen in the liquid crystal display device.

To achieve the above object, the present invention provides the signal processing unit in a liquid crystal display device to display an image (or images) on the liquid crystal panel, which comprises a brightness component appearance frequency measuring unit, a parameter outputting unit, a changing signal outputting unit, a brightness component changing unit, and a changed video signal outputting unit.

More specifically, the brightness component appearance frequency measuring unit measures an appearance frequency of each brightness component in the input video signal. The parameter outputting unit outputs a distribution of each brightness component in the video signal, based on the measured appearance frequency of each brightness component, as a parameter. This parameter represents the distribution of the brightness component in the video signal.

The changing signal outputting unit alters a signal recorded in a recording unit, by using the parameter, and outputs the signal as the changing signal. The signal recorded in the recording unit has a function of generating the changing signal. The changing signal has a function of changing the original distribution of each brightness component in the input video signal to the other distribution which is viewable for the viewer.

The brightness component changing unit changes the original distribution of each brightness component in the video signal, by using the changing signal, and outputs a video signal in which the distribution of each brightness component is changed.

According to the signal processing unit of the present invention, the input video signal was output to the liquid crystal panel after the original distribution of each brightness component is changed to the other distribution which is viewable for the viewer.

The signal processing unit of the present invention is preferably configured so that the original distribution of each brightness component of the input video signal can be changed by adding the changing signal to each brightness component of the input video signal, by the brightness component changing unit.

On the other hand, the liquid crystal display device of the present invention comprises the signal processing unit having the above configuration.

According to the liquid crystal display device of the present invention, a liquid crystal display device having the contrast as high as the CRT display device can be achieved.

BRIEF DESCRIPTION OF THE DRAWINGS

The above object and features of the present invention will be more apparent from the following description of the preferred embodiments with reference to the accompanying drawings, wherein:

FIG. 8 is a diagram for explaining an operation example regarding a parameter "a" used in a histogram analyzing unit in another embodiment of the present invention.

DESCRIPTION OF THE PREFERRED EMBODIMENTS

The configurations and the operations of some preferred embodiments of the present invention will be described with reference to the accompanying drawings (FIGS. 1 to 8).

Figure 1:
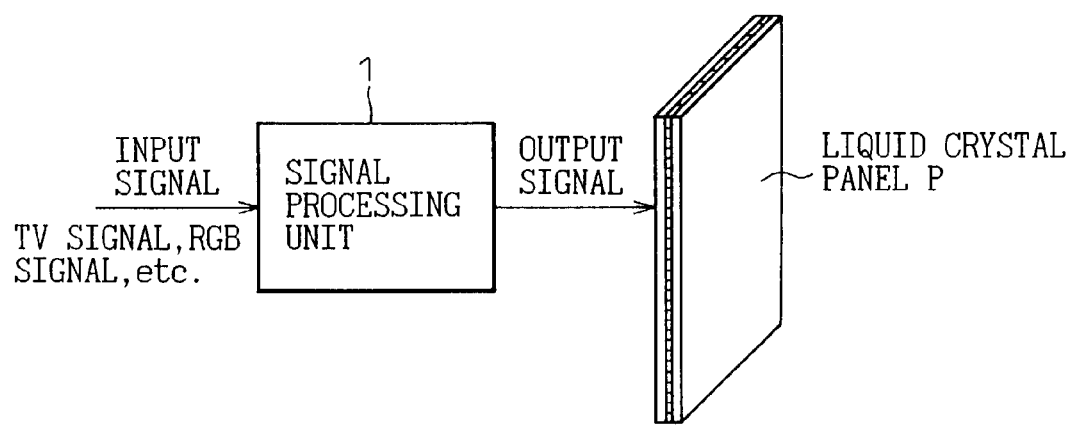
FIG. 1 is a block diagram showing a whole configuration of an embodiment of the present invention.

FIG. 1 is a block diagram showing a whole configuration of an embodiment of the present invention.

In FIG. 1, a video signal, such as a television signal or an RGB signal, is input into a signal processing unit as an input signal. The brightness component of the input signal is changed to be a viewable distribution for the viewer, and is output to a liquid crystal panel P as an output signal.

Figure 2:
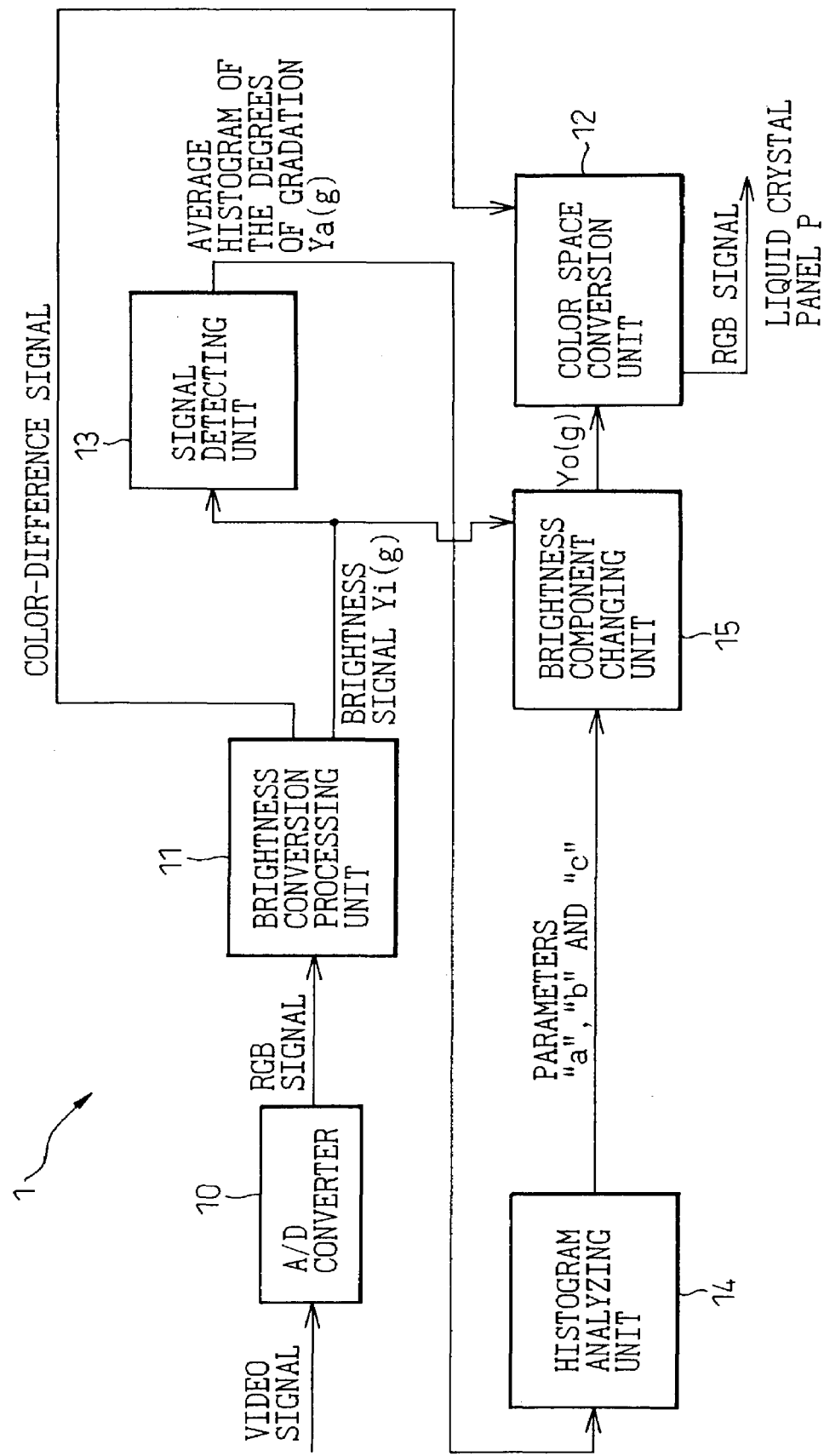
FIG. 2 is a block diagram showing a signal processing unit in the embodiment of the present invention.

FIG. 2 is a block diagram showing a signal processing unit in the embodiment of the present invention. In this drawing, a detailed structure of the signal processing unit 1 of FIG. 1 is shown representatively. Hereinafter, the same constituent elements as mentioned before will be referred to using the same reference numerals.

In FIG. 2, the video signal is input into an AD converter (Analog to Digital Converter) 10 and is output as an RGB signal. The RGB signal output from the AD converter 10 is input to the brightness conversion processing unit 11 which executes a color space conversion process, and the RGB signal is output as a color-difference signal. Also in the brightness conversion processing unit 11, the brightness component of the RGB signal is extracted. The extracted brightness component is output as a brightness signal $Yi(g)$ from the brightness conversion processing unit 11. In this case, "g" is a variable representing a given degree of gradation.

The color-difference signal output from the brightness conversion processing unit 11 undergoes a color process in a color processing unit (not shown), and is input to a color space conversion unit 12.

The brightness signal $Yi(g)$ output from the brightness conversion processing unit 11 is input to a signal detecting unit 13. In the signal detecting unit 13 in which the brightness signal $Yi(g)$ is input, a histogram (a data distribution for every degree of gradation) of the brightness on the whole screen is measured for each frame ranging from the N-th frame through the (N+M)-th frame, concerning the input brightness signal $Yi(g)$, and is averaged to derive an average histogram $Ya(g)$ by the degrees of gradation (g). Here, "N" is an integer equal to 1 or more than 1, and "M" is an integer equal to 0 or more than 0.

The average histogram $Ya(g)$ of the degrees of gradation (g) output from the signal detecting unit 13 is input to a histogram analyzing unit 14, which analyzes the distribution of the brightness component. In the histogram analyzing unit 14, each of parameters "a", "b" and "c" representing the characteristic of the image (or images) is determined based on the result of an analysis by the histogram analyzing unit 14.

Figure 3:
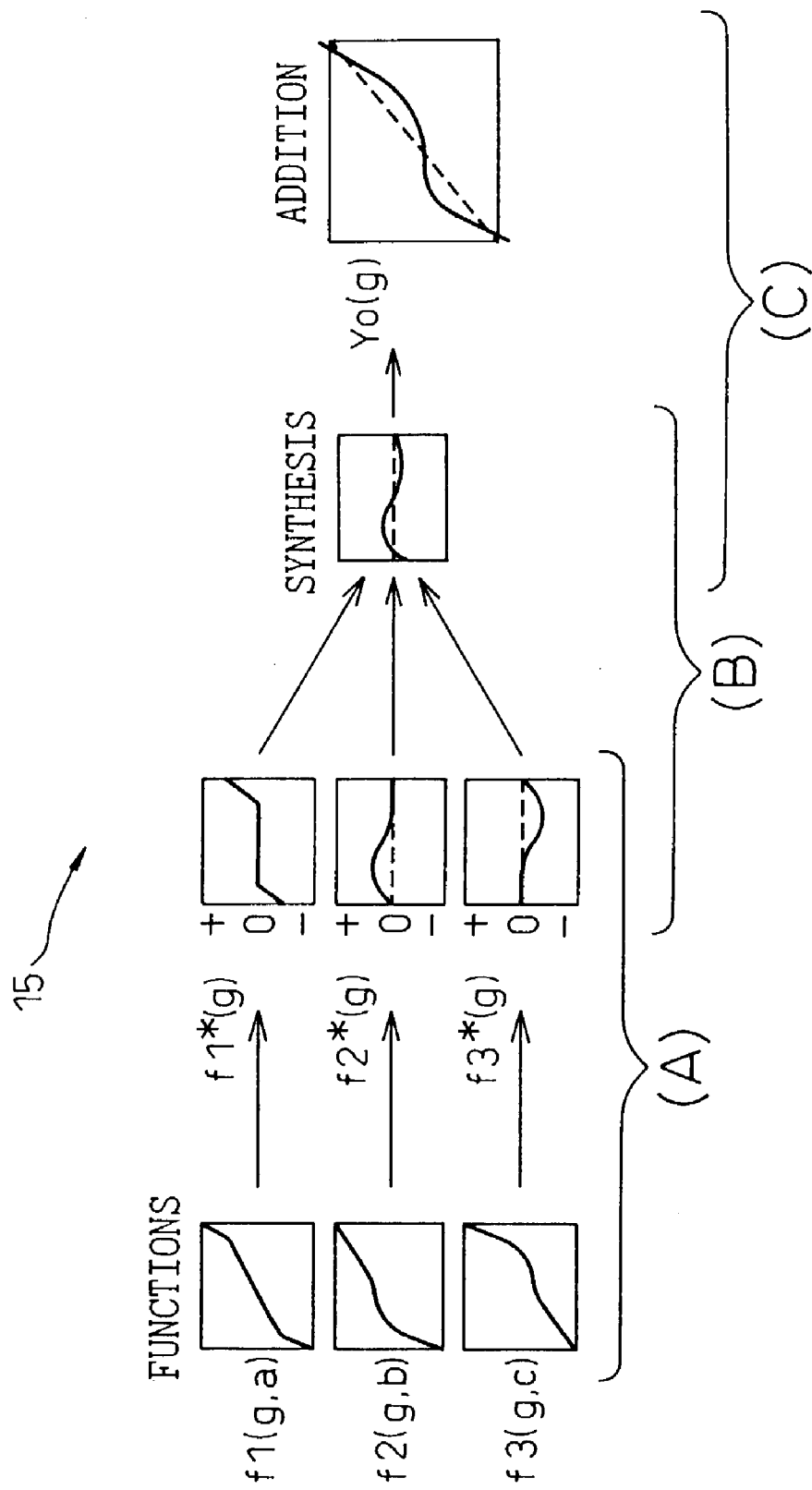
FIG. 3 is a block diagram showing a brightness component changing unit in the embodiment of the present invention.

FIG. 3 is a block diagram showing a brightness component changing unit in the embodiment of the present invention.

Each parameter determined in the histogram analyzing unit 14 is input to the brightness component changing unit 15, and is used to change a plurality of functions (f1 (g) to fn(g); e.g., f1 (g,a), f2 (g,b) and f3 (g,c)) which have been prepared in advance, to another plurality of functions (f1*(g) to fn*(g); e.g., f1*(g), f2*(g) and f3*(g)) (See portion (A) of FIG. 3).

The changed functions (f1*(g) to fn*(g)) are synthesized in the brightness component changing unit 15 (See portion (B) of FIG. 3), and added to the brightness component $Yi(g)$ of each frame ranging from the value at the position of the (N+M+L)-th frame through the value at the position of the (N+M+K)-th frame (See the below-mentioned formula (I)). A signal obtained by the above addition is output from the brightness component changing unit 15, as an output signal $Yo(g)$ (See portion (C) of FIG. 3).

$$Yo(g)=\{f^*_1(g)+f^*_2(g)+f^*_3(g)\}+Yi(g) \qquad (I)$$

In this case, each of "K" and "L" is an integer equal to 0 or more than 0.

The output signal $Yo(g)$ output from the brightness component changing unit 15 is input to the color space conversion unit 12, together with the signal output from the color processing unit. The color space process is carried out for the output signal $Yo(g)$ in the color space conversion unit 12, and is output to the liquid crystal panel P, as a final RGB signal.

The above "N", "M", "L" and "K" are parameters which are separated from each other. Therefore, each of these parameters can be defined, independently of each other.

Figure 4:
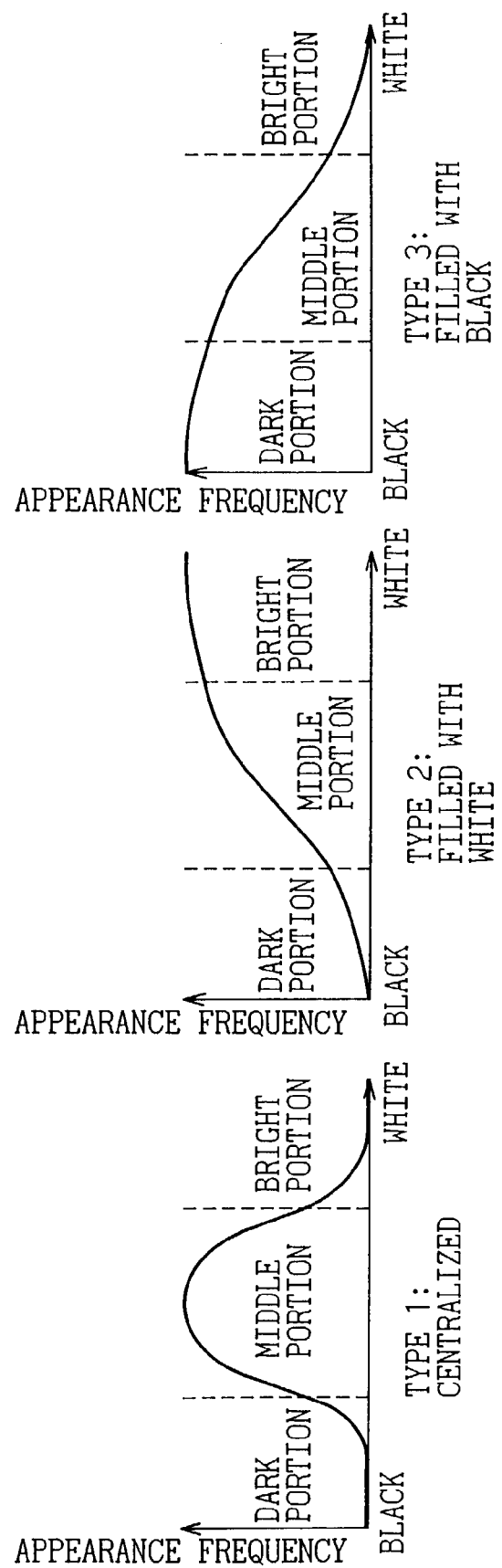
FIG. 4 shows a representative example of the distribution characteristic in the embodiment of the present invention.

FIG. 4 shows a representative example of the distribution characteristic in the embodiment of the present invention.

If the distribution of the brightness component is expressed as an appearance frequency of a monochrome image as shown in FIG. 4, the distribution of the brightness component tends to be centralized as in the Type 1 when the image has low contrast. When the image is too bright, the distribution of the brightness component tends to be filled with white as in the Type 2. When the image is too dark, the distribution of the brightness component tends to be filled with black as in the Type 3.

The histogram $Ya(g)$ by the degrees of gradation (g), which is output from the signal detecting unit 13 and is input to the histogram analyzing unit 14, is divided into a plurality of areas, including a dark portion, a middle portion and a bright portion, by the histogram analyzing unit 14, regarding the gradation of the brightness of the average histogram $Ya(g)$. In the histogram analyzing unit 14, the appearance values (i.e., appearance frequencies) of the brightness components in the respective areas are compared with each other.

In the histogram analyzing unit 14, a parameter "a" representing the distribution characteristic of the Type 1, a parameter "b" representing the distribution characteristic of the Type 2, and a parameter "c" representing the distribution characteristic of the Type 3 are determined, based on the result of the above comparison.

Figure 5:
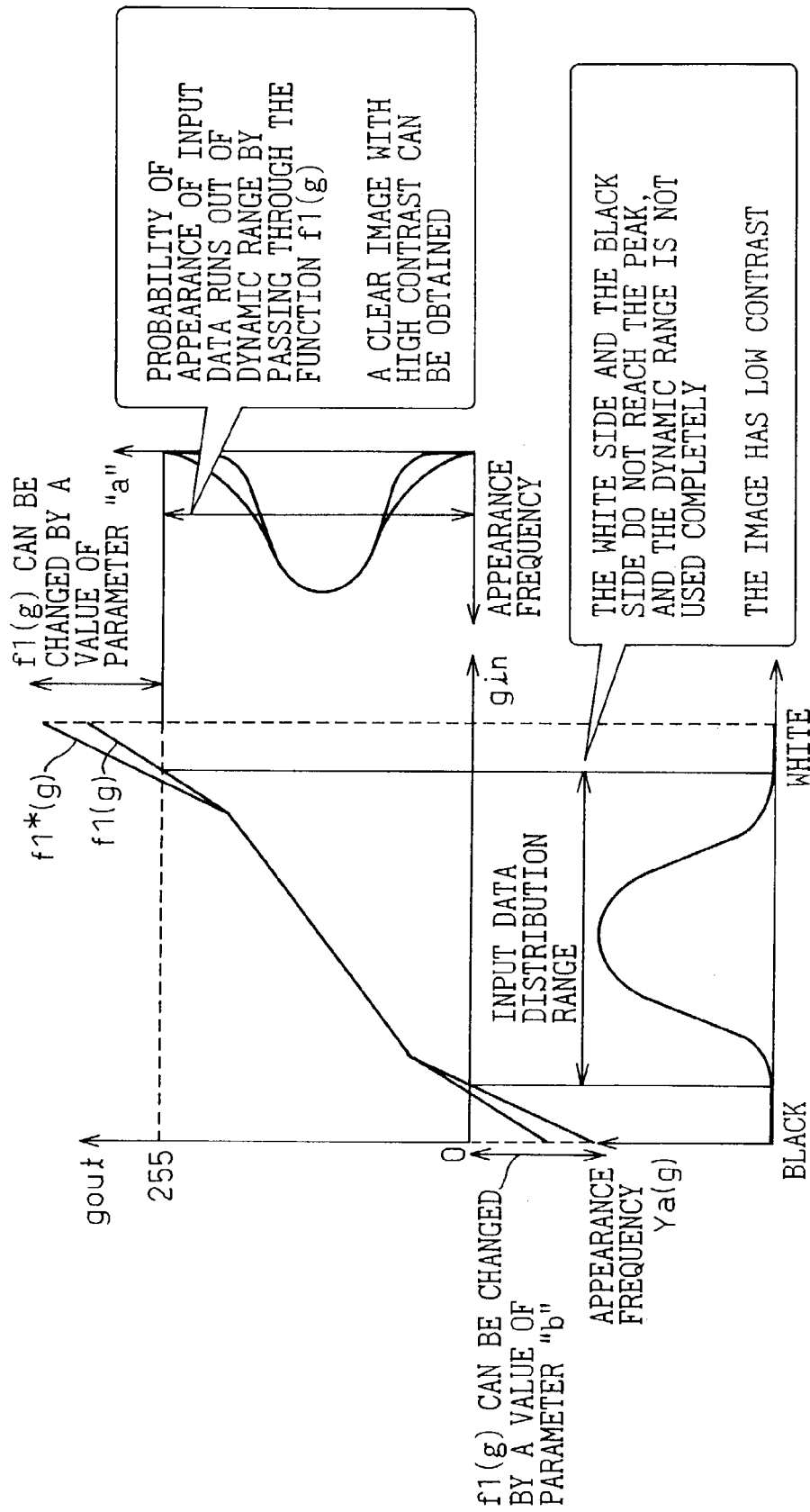
FIG. 5 is a diagram for explaining a first operation example of the brightness component changing unit in the embodiment of the present invention.
Figure 6:
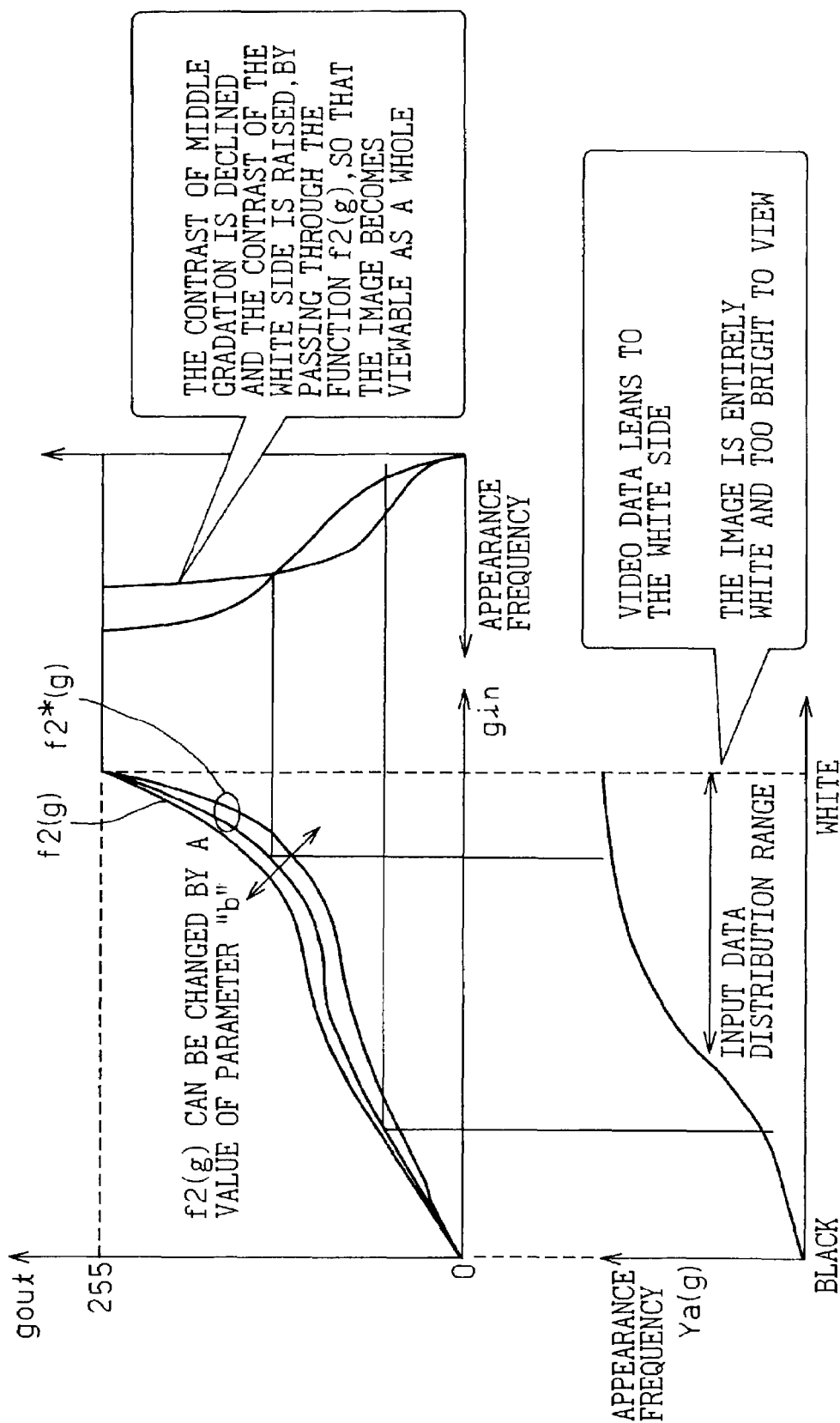
FIG. 6 is a diagram for explaining a second operation example of the brightness component changing unit in the embodiment of the present invention.
Figure 7:
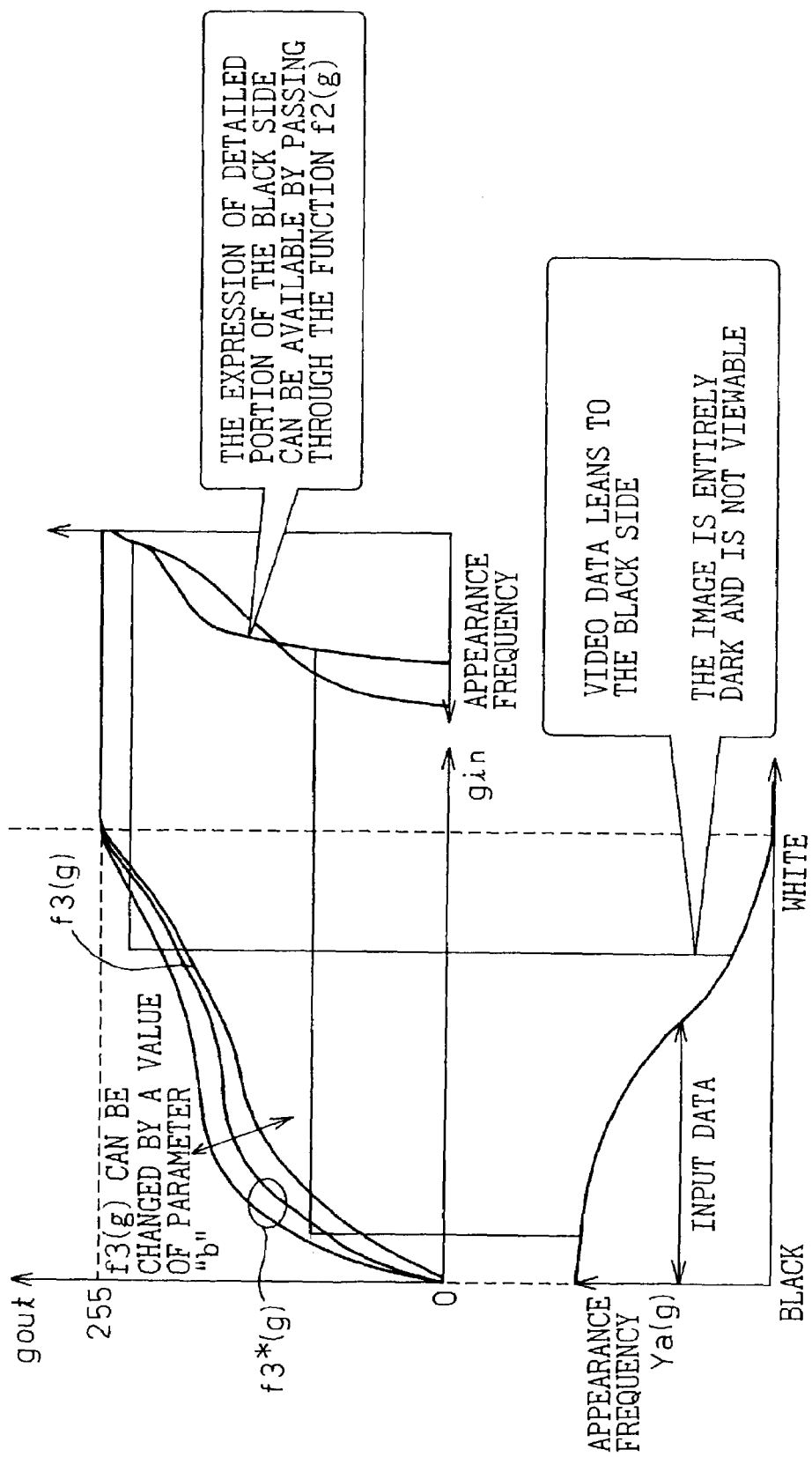
FIG. 7 is a diagram for explaining a third operation example of the brightness component changing unit in the embodiment of the present invention.

FIGS. 5 to 7 are diagrams for explaining the first, second and third operation examples of the brightness component changing unit in the embodiment of the present invention, respectively.

The brightness component changing unit 15 changes a plurality of functions (f1(g) to f3(g)) which have been prepared in advance, based on the determined parameters "a", "b" and "c". FIGS. 5 to 7 show the conditions in which the relationship between the input signal (gin) and the output signal (gout) in the brightness component changing unit 15 is changed.

The function f1(g) is a function prepared in advance as a suitable one for changing the original brightness component of an image to a viewable brightness component for a viewer, when the image has low contrast (See FIG. 5). The function f2(g) is a function prepared in advance as a suitable one for changing the original brightness component of an image to a viewable brightness component for a viewer, when the image is too bright (See FIG. 6). The function f3(g) is a function prepared in advance as a suitable one for changing the original brightness component of an image to a viewable brightness component for a viewer, when the image is too dark (See FIG. 7).

The brightness component changing unit 15 changes the function f1(g) to the function f1*(g) based on the parameter "a" (See FIG. 5). Similarly, the brightness component changing unit 15 changes the function f2(g) to the function f2*(g) based on the parameter "b" (See FIG. 6), and changes the function f3(g) to the function f3*(g) based on the parameter "c" (See FIG. 7).

As mentioned above, the brightness component changing unit 15 synthesizes these changed functions (f1*(g) to f3*(g)) (See portion (B) of FIG. 3), which is output as an output signal Yo(g) corresponding to an average histogram of the present input image, by adding the synthesized plural functions to the brightness component Yi(g) of each frame ranging from the (N+M+L)-th frame through the (N+M+K)-th frame (See portion (C) of FIG. 3).

As described above, according to the embodiment of the present invention, the average histogram of the present input image Yo(g) is output based on a value of each of the parameters "a", "b" and "c" which are successively calculated in accordance with the variation of the input image (or input images). Therefore, according to the embodiment, the distribution of the brightness component of the input image is dynamically optimized concerning the variation of the input image.

Thus, the brightness component of the input image signal is automatically controlled so that the brightness is decreased, when the image is entirely white and too bright to view (i.e., when video data leans to the white side). In contrast, the above-mentioned brightness component is automatically controlled so that the blacked portion is made viewable for a viewer, when the image is entirely dark and is not viewable (i.e., when video data leans to the black side). In contrast, the above-mentioned brightness component is automatically controlled so that the vivid image (or clear image) with high contrast can be obtained, when neither the white side nor the black side reach the peak thereof, and the dynamic range is not used completely.

FIG. 8 is a diagram for explaining an operation example regarding a parameter "a" used in the histogram analyzing unit in another embodiment of the present invention.

In an embodiment of FIG. 8, the histogram analyzing unit 14 can carry out the below-mentioned operation, in addition to the above-mentioned operations.

For example, when the brightness component changing unit 15 adds a plurality of functions (f1*(g) to fn*(g)) obtained based on a plurality of frames positioned between the N-th frame and the (N+M)-th frame to the brightness component (or brightness signal) Yi(g) of each frame positioned between the (N+M+1)-th frame and the (N+M+L)-th frame, the output signal Yo(g) of each frame positioned between the (N+M+1)-th frame and the (N+M+K)-th frame varies, based on a parameter which is determined by each frame positioned between the (N+M+1)-th frame and the (N+M+L)-th frame.

Therefore, in this case, some unnatural discontinuous points occur between the (N+M+L)-th frame and the (N+M+L+1)-th frame. To avoid this situation, for analyzing the histogram analyzing unit 14 linearly changes the value of each of the parameters "a", "b" and "c", ranging from the value of each of the parameters "a", "b" and "c" determined based on each frame positioned between the N-th frame and the (N+M)-th frame through the value of each of the parameters "a", "b" and "c" based on each frame positioned between the (N+M+1)-th frame and the (N+M+L)-th frame.

Then, the brightness component changing unit 15 changes a plurality of functions (f1(g) to fn(g)), which have been prepared in advance, based on the values of the parameters "a", "b" and "c" which change linearly, and synthesizes these changed functions (f1*(g) to fn*(g)). These synthesized functions are added to the brightness component Yi(g) of each frame positioned between the (N+M+1)-th frame and the (N+M+L)-th frame. A signal obtained by the above addition is output as an output signal Yo(g).

Therefore, according to the embodiment of FIG. 8, any unnatural discontinuous point does not occur, in an image (See portion (B) of FIG. 8) in which a flashing occurs because of an extreme brightness or darkness, and an image in which a histogram varies continuously, in the case of a fade-in or a fade-out (See portion (A) of FIG. 8).

In still another embodiment of the present invention, there is provided a real-time system signal processing unit in a liquid crystal display device, to which a video signal is input and through which an image is displayed on a liquid crystal panel, which includes a brightness component appearance frequency measuring unit of one frame that measures an appearance frequency of each brightness component for every frame in the video signal; a parameter outputting unit of one frame that successively outputs a distribution of each brightness component of each frame in the video signal, as a plurality of one frame parameters, based on the appearance frequency of each frame measured by the brightness component appearance frequency measuring unit of one frame; a changing signal outputting unit that successively alters input signals recorded in a recording unit, by using the plurality of one frame parameters output from the parameter outputting unit of one frame, and that successively outputs the input signals as a changing signal for one frame; and a brightness component changing unit in a real-time system that successively changes a distribution of each brightness component of each frame in the video signal, by using the change signal for one frame which is successively outputs from the changing signal outputting unit, and that successively outputs the video signal in which the distribution of each brightness component is changed.

According to the invention described in this embodiment, an initial brightness component of the input video signal is changed in real time to the brightness component having a viewable distribution for a viewer, and is output to the liquid crystal panel.

Furthermore, in an additional embodiment of the present invention, there is provided a signal processing unit in a liquid crystal display device, to which a video signal is input and through which an image is displayed on a liquid crystal panel, which includes a brightness component appearance frequency measuring unit that measures an appearance frequency of each brightness component in the video signal; a successive parameter outputting unit that successively outputs a distribution of each brightness component in the video signal, as a plurality of successive parameters, based on the appearance frequency measured by the brightness component appearance frequency measuring unit; a serial parameter outputting unit, to which each of the plurality of successive parameters successively output from the successive parameter outputting unit is successively input, and which outputs values linearly changing between respectively parameters successively input from the successive parameter outputting unit, as a plurality of serial parameters; a changing signal outputting unit that alters the input signals recorded in a recording unit, by using the plurality of serial parameters output from the serial parameter outputting unit, and that outputs as a changing signal; and a brightness component changing unit that changes a distribution of each brightness component in the video signal, by using the changing signal which is output from the changing signal outputting unit, and that outputs the video signal in which the distribution of each brightness component is changed.

According to the invention described in this embodiment, an initial brightness component of the input video signal is changed for every few frames to a brightness component having a viewable distribution for a viewer, and is output to the liquid crystal panel.

As described above, according to the preferred embodiments of the present invention, with regard to a scene in which the screen is entirely bright, the bright portion can be expressed so as to be viewable, and with regard to a scene in which the screen is entirely dark, the dark portion can be expressed so as to be viewable. Further, with regard to a scene which lacks in the brightness component in both the bright portion and the dark portion, the screen can be expressed with high contrast.

Moreover, it is not necessary to prepare particular communication means on the side in which a video source is transmitted, as the control of the visibility of the scene mentioned above is executed automatically by detecting a behavior of data inside the liquid crystal display device of the present invention.

Therefore, according to the preferred embodiment of the present invention, in the liquid crystal display device, the bright scene or the dark scene can be expressed so as to be viewable and as vivid as a television apparatus having a CRT display device.

Thus, according to the preferred embodiment of present invention, a natural, vivid and viewable image can be provided to a viewer who is familiar with a television apparatus having a CRT display device with high brightness.

The invention claimed is:

1. A signal processing unit in a liquid crystal display device, to which a video signal is input and through which an image is displayed on a liquid crystal panel, comprising:
   a brightness component appearance frequency measuring unit that measures an appearance frequency of each brightness component in the video signal;
   a parameter outputting unit that outputs a distribution of each brightness component in the video signal, as a plurality of parameters representing the distribution characteristics of the brightness and the distribution characteristics of the contrast in each of a plurality of areas in the image, based on said appearance frequency measured by the brightness component appearance frequency measuring unit;
   a brightness component changing unit that changes signals which have been prepared in advance, respectively corresponding to the plurality of parameters outputted from the parameter outputting unit, by using the plurality of parameters, that changes a distribution of each brightness component in the video signal, by using a changing signal which is obtained by changing each of the signals which have been prepared in advance, and that outputs the processed, input video signal as an output video signal in which the distribution of each brightness component thereof is changed.

2. A signal processing unit according to claim 1, wherein the change of the distribution of each brightness component by the brightness component changing unit is carried out by adding said changing signal to each brightness component of said video signal.

3. A liquid crystal display device having a signal processing unit according to claim 1.

4. A liquid crystal display device having a signal processing unit according to claim 2.

5. A real-time system signal processing unit in a liquid crystal display device, to which a video signal is input and through which an image is displayed on a liquid crystal panel, comprising:
   a brightness component appearance frequency measuring unit of one frame that measures an appearance frequency of each brightness component for every frame in the video signal,
   a parameter outputting unit of one frame that successively outputs a distribution of each brightness component of every frame in the video signal, as a plurality of one frame parameters representing distribution characteristics of brightness and distribution characteristics of contrast in each of a plurality of areas of the image, based on said appearance frequency of each frame measured by the brightness component appearance frequency measuring unit of one frame;
   a changing signal outputting unit of one frame that successively alters previously prepared input signals respectively corresponding to the plurality of one frame parameters outputted from the parameter outputting unit of one frame, by using said plurality of one frame parameters output from the parameter outputting unit of one frame, and that successively outputs said input signals as a changing signal for one frame; and
   a brightness component changing unit in a real-time system that successively changes a distribution of each brightness component of each frame in the video signal, by using the changing signal for one frame which is successively output from the changing signal outputting unit of one frame, and that successively outputs the processed, input video signal as an output video signal in which the distribution of each brightness component thereof is changed.

6. A signal processing unit in a liquid crystal display device, to which a video signal is input and through which an image is displayed on a liquid crystal panel, comprising:
   a brightness component appearance frequency measuring unit that measures an appearance frequency of each brightness component in the video signal;
   a successive parameter outputting unit that successively outputs a distribution of each brightness component in the video signal, as a plurality of successive parameters representing distribution characteristics of brightness and distribution characteristics of contrast in each of a plurality of areas in the image, based on said appearance frequency measured by the brightness component appearance frequency measuring unit;

a serial parameter outputting unit, to which each of said plurality of successive parameters successively output from the successive parameter outputting unit is successively input, and which outputs values linearly changing between respective parameters successively input from the successive parameter outputting unit, as a plurality of serial parameters;

a changing signal outputting unit that alters previously prepared input signals respectively corresponding to the plurality of serial parameters, by using said plurality of serial parameters output from the serial parameter outputting unit, and that outputs the altered input signals as a changing signal; and a brightness component changing unit that changes a distribution of each brightness component in the video signal, by using the changing signal which is output from the changing signal outputting unit, and that outputs the processed, input video signal as an output video signal in which the distribution of each brightness component thereof is changed.

* * * * *

UNITED STATES PATENT AND TRADEMARK OFFICE
CERTIFICATE OF CORRECTION

PATENT NO.        : 7,167,214 B2
APPLICATION NO. : 10/440318
DATED             : January 23, 2007
INVENTOR(S)       : Yoji Hirosue It is certified that error appears in the above-identified patent and that said Letters Patent is hereby corrected as shown below:

Title Page, Column 1 (Assignee), Line 1, after "Fujitsu" delete "Hitachi Plasma Display".

Signed and Sealed this

Fifteenth Day of May, 2007

JON W. DUDAS
*Director of the United States Patent and Trademark Office*